(12) United States Patent
Montano et al.

(10) Patent No.: US 12,384,610 B2
(45) Date of Patent: Aug. 12, 2025

(54) DIRECTIONAL TEAR PACKAGING FILM

(71) Applicant: Amcor Flexibles North America, Inc., Neenah, WI (US)

(72) Inventors: Susan L. Montano, Oshkosh, WI (US); Kevin P. Nelson, Appleton, WI (US); Andrew S. Ives, Neenah, WI (US)

(73) Assignee: Amcor Flexibles North America, Inc, Neenah, WI (US)

( * ) Notice: Subject to any disclaimer, the term of this patent is extended or adjusted under 35 U.S.C. 154(b) by 778 days.

(21) Appl. No.: 17/428,511

(22) PCT Filed: Jun. 28, 2019

(86) PCT No.: PCT/US2019/039810
§ 371 (c)(1),
(2) Date: Aug. 4, 2021

(87) PCT Pub. No.: WO2020/162963
PCT Pub. Date: Aug. 13, 2020

(65) Prior Publication Data
US 2022/0112018 A1    Apr. 14, 2022

Related U.S. Application Data

(60) Provisional application No. 62/800,683, filed on Feb. 4, 2019.

(51) Int. Cl.
*B65D 75/58* (2006.01)
*B32B 3/26* (2006.01)
(Continued)

(52) U.S. Cl.
CPC .......... *B65D 75/5805* (2013.01); *B32B 3/266* (2013.01); *B32B 7/12* (2013.01); *B32B 27/08* (2013.01); *B32B 27/306* (2013.01); *B32B 27/36* (2013.01); *B65D 65/40* (2013.01); *B32B 2250/03* (2013.01); *B32B 2250/04* (2013.01);
(Continued)

(58) Field of Classification Search
CPC .... B65D 75/5805; B65D 65/40; B32B 3/266; B32B 7/12; B32B 27/08; B32B 27/306; B32B 27/36; B32B 2250/03; B32B 2250/04; B32B 2250/05; B32B 2270/00; B32B 2307/518; B32B 2307/582;
(Continued)

(56) References Cited

U.S. PATENT DOCUMENTS 4,610,914 A    9/1986  Newsome
9,561,889 B2   2/2017  Dayrit et al.
(Continued)

FOREIGN PATENT DOCUMENTS

BR    102013027688 A2   10/2015
JP         9111060 A2   10/1995
WO         9610053 A1    4/1996

OTHER PUBLICATIONS

PCT International Search Report, international application No. PCT/US2019/039810, issued Sep. 19, 2019, 3 pages.

*Primary Examiner* — Michael C Miggins

(57) ABSTRACT

The present disclosure relates to flexible, multilayered packaging films and packages produced from the films. In particular, the films include a machine direction linear tear layer that comprises from 60 percent to 95 percent ethylene vinyl alcohol copolymer (EVOH) and from 5 percent to 40 percent polyethylene. The films and packages demonstrate improved machine directional linear tear.

5 Claims, 7 Drawing Sheets

(51) Int. Cl.
  *B32B 7/12* (2006.01)
  *B32B 27/08* (2006.01)
  *B32B 27/30* (2006.01)
  *B32B 27/36* (2006.01)
  *B65D 65/40* (2006.01)

(52) U.S. Cl.
  CPC ....... *B32B 2250/05* (2013.01); *B32B 2270/00* (2013.01); *B32B 2307/518* (2013.01); *B32B 2307/582* (2013.01); *B32B 2307/7244* (2013.01); *B32B 2307/736* (2013.01); *B32B 2307/738* (2013.01); *B32B 2439/46* (2013.01)

(58) Field of Classification Search
  CPC ...... B32B 2307/7244; B32B 2307/736; B32B 2307/738; B32B 2439/46
  See application file for complete search history.

(56) References Cited

U.S. PATENT DOCUMENTS

| | | |
|---|---|---|
| 2002/0150704 A1 | 10/2002 | Baer et al. |
| 2005/0084636 A1 | 4/2005 | Papenfuss et al. |
| 2012/0094042 A1 | 4/2012 | Lee et al. |
| 2014/0030500 A1 | 1/2014 | Sandkuehler et al. |
| 2018/0009203 A1 | 1/2018 | Ball et al. |

DIRECTIONAL TEAR PACKAGING FILM

TECHNICAL FIELD

The present disclosure relates to flexible, multilayered packaging films and packages produced from the films. In particular, the films include a layer that includes an ethylene vinyl alcohol copolymer and polyethylene blend composition. The films and packages demonstrate improved machine directional linear tear.

BACKGROUND

Tear-open, flexible packaging is employed widely for commercial packaging of food products, personal care products, and human health products. Food items may include fresh or frozen foods, or liquid or dry items, that may be for human or animal consumption. Many items besides food, which are not limited to pharmaceuticals, nutraceuticals, cosmetics, hard-to-hold products, cleaners, chemicals, wipes, medical products, electronic devices, medical devices or precision instruments, can be packaged in various package formats that include a tear-off (removable) portion or a tear-open portion. Various packaging formats can be bags, pouches, flow-wrap packages, chub, bulk bag, and packages that include a combination of formable and non-formable components (e.g., rigid tray and flexible lid, cup and lidding or vacuum skin packaging (VSP)).

Development of flexible packaging materials has led to improved durability, toughness, puncture and tear resistance, for example, by including oriented film in the packages. Further, flexible packaging allows the incorporation of durability features and/or moisture, dust, UV and/or gas barriers into the packages when such properties are desired for maintaining the product contained therein. Flexible film packages have become increasingly more difficult to tear open with these improvements.

Packaging films that are not intentionally oriented in the machine direction (so-called machine direction oriented films) or the machine and transverse directions (so-called biaxially oriented films) inherently may still have some molecular orientation due to stretching that occurs in the production processes for non-oriented films. The extent of this form of orientation depends on the processing equipment, processing conditions and materials used. Parameters specific to equipment geometry like die gap, die width (or diameter for annular processes), final film thickness and final film width establish the maximum orientation bounds for those processes. Processing conditions like film speed, temperature and cooling rate, determine a factor known as process time. Process time is a characteristic time that describes the period when sufficient energy is available for molecular motion to occur. In film fabrication, this is often thought of as the time spent after film drawdown is complete but before chain motion is restricted by cooling. A second characteristic time, known as a polymer's relaxation time, is defined by specific material properties. Relaxation time describes the time where large-scale chain motion is able to occur. It is influenced by chain length, chain flexibility, branching, etc. When the process time is longer than the relaxation time, it is expected that sufficient chain motion occurs such that much of the process-induced orientation is lost. Conversely, when process time is short relative to relaxation time, some fraction of process-induced orientation is maintained. In annular processes like film blowing, it is common that some degree of machine direction orientation is preserved.

For many materials, e.g., polyethylene, the direction of tear propagation coincides with the predominant direction of molecular orientation. For compositionally simple films, this feature allows the film manufacturer to control the direction of tear by managing the processing conditions that influence molecular orientation. Many packaging films, however, are assembled from layers of differing materials. For example, it is known by those skilled in the art that the addition of ethylene vinyl alcohol copolymer (EVOH), a common oxygen barrier component of a packaging film, increases the propensity for tearing in a direction perpendicular to the predominant molecular orientation direction. As a result, the direction of tear propagation for a multicomponent film structure can be a complex function of the individual tear behaviors of the component materials. Often, these films tear in undesirable directions that do not coincide with the preferred package opening direction.

The lack of control of the direction of tearing leads to uneven tearing of the package film that results in difficulty when opening the package. The lack of control while tearing contributes to premature spillage of the packaged contents. For example, in a retail setting, shredded cheese may be packaged in a stand-up pouch. The pouch includes a front and back panel, a removable portion (header) that is at one end of the pouch and that is torn from one side edge of the pouch to an opposite side edge to access the contents. The tear direction of the front panel diverges from the tear direction of the back panel such that end points of the tear (at the side edge from where the tear initiated and at the opposite side edge) are at different places along the pouch edge. Because of these diverging end points, excessive force is required to remove or separate the removable portion from the remainder of the pouch, which jerks the pouch and frequently causes the cheese to discharge from the pouch in an explosive manner. Unpredictable tear propagation can result in incomplete removal of the header portion of the package and subsequent difficulty in product dispensing.

Some packages incorporate features to facilitate tearing in the machine direction. A non-limiting example includes a combination of a tear notch and surface roughened lines that can be added to the package. The surface roughened lines must be superimposed on each other and be aligned with the tear notch to facilitate linear tear. One skilled in the art will recognize that keeping the surface roughened lines in registration during the manufacturing process of multiple film packages is difficult without adding greater complexity to the manufacturing process and increased costs to production.

Other techniques to facilitate linear tear include forming scratches, slits, lines or perforations in the outside or inside layer of the packaging film. These techniques also increase production costs due to the purchase of additional equipment and/or adding further complexity to the manufacturing process of the package.

Film structures and packaging therefrom continue to lack machine directional tear. Equipment and/or complex steps are added to the manufacturing process to address this problem that ultimately increases costs.

SUMMARY

Accordingly, there is a need for a packaging film that can provide machine directional linear tear without additional manufacturing complexity and costs and that can be formed into a package that maintains machine directional linear tear.

The present application describes a machine directional linear tear packaging film. In one embodiment, a packaging film includes a coextruded film that includes a machine direction linear tear layer that includes from 60 percent to 95 percent ethylene vinyl alcohol copolymer (EVOH) and from 5 percent to 40 percent polyethylene. The packaging film includes a second layer. The EVOH includes an ethylene content from 24 mole percent to 50 mole percent.

Other features that may be used individually or in combination with respect to the above-mentioned embodiment or any embodiment of the present application are as follows.

The packaging film may include a second layer that includes a sealant layer including a sealing surface. The packaging film may include EVOH that includes an ethylene content of 44 mole percent to 50 mole percent. The packaging film may include a Trouser Tear Angle Average of the Absolute Values that is 2.0 degrees or less according to ASTM 1938 as described herein. The packaging film may include polyethylene that includes ultra-low density polyethylene, low density polyethylene, linear low density polyethylene, medium density polyethylene, ethylene vinyl acetate copolymer (EVA), or blends thereof. The packaging film may be a shrink film that includes a minimum of 5 percent free shrink in each direction, the machine direction or the transverse direction. The packaging film may further include an oriented film where the oriented film may be a biaxially oriented film.

A package that includes any embodiment of the packaging film.

In another embodiment, a directional tear packaging film includes a first film that includes a machine direction linear tear layer. The machine direction linear tear layer includes from 60 percent to 95 percent ethylene vinyl alcohol copolymer (EVOH) and from 5 percent to 40 percent polyethylene. The first film includes a second layer that includes a sealing layer comprising a sealing surface. The packaging film includes a laminating agent and a second film that includes an oriented film. The first film is a coextruded film. The laminating agent is positioned between the first film and the second film such that the sealing surface is exposed. The EVOH of the machine direction linear tear layer comprises an ethylene content from 24 mole percent to 50 mole percent.

Other features that may be used individually or in combination with respect to this embodiment are as follows.

The packaging film may include a Trouser Tear Angle Average of the Absolute Values that is 5 degrees or less according to ASTM 1938 as described herein. The second film may include an oriented polyester film. The second film may include a biaxially oriented polyester film. The laminating agent may include low density polyethylene.

A package that includes any embodiment of the packaging film. The package may be a pouch that includes a removable portion, a product space portion and a tear initiator. The tear initiator may include a tear notch or a score line.

BRIEF DESCRIPTION OF THE DRAWINGS

Other objects and advantages of the present disclosure will become more apparent to those skilled in the art in view of the following description and the accompanying figures.

Figure 1:
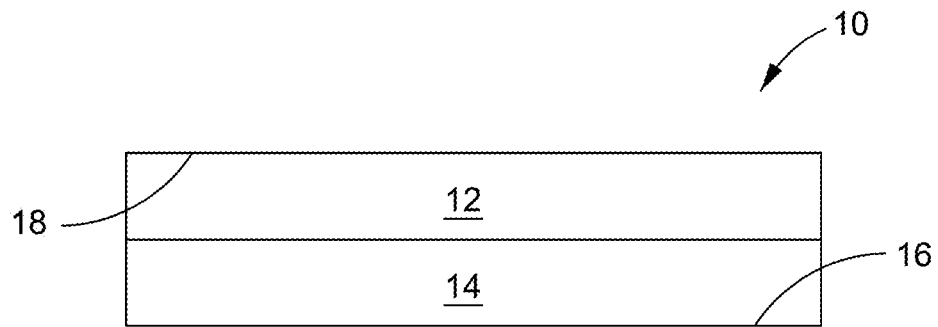
FIG. 1 illustrates a cross-sectional view of a first embodiment of a multilayer packaging film disclosed herein.

The figures show some but not all embodiments. The figures are not necessarily to scale. Like numbers used in the figures refer to like components. It will be understood, however, that the use of a number to refer to a component in a given figure is not intended to limit the component in another figure labeled with the same number.

DETAILED DESCRIPTION

A packaging film that demonstrates improved machine directional linear tear is disclosed herein. The packaging film may be a coextruded film or a laminate that includes a coextruded film. The coextruded film may be a multilayer film where the composition of one of the layers includes ethylene vinyl alcohol copolymer (EVOH) blended with polyethylene. Further, a package can be made from the packaging film when the film is sealed to itself or to another suitable packaging film or material (exposed sealant surface to exposed sealant surface).

The term "film", as used herein, refers to a polymeric web of any thickness. The polymeric web may be flexible, semi-rigid or rigid.

The term, "machine directional linear tear", as used herein, refers to the propensity of the film to tear in the direction of manufacture of the film along a straight line that includes the initiation and end points of the tear.

The terms "coextruded", "coextrude", or "coextrusion", as used herein, refer to the process of extruding two or more polymer materials through a single die with two or more orifices arranged so that the extrudates merge and weld together into a laminar structure before chilling (i.e., quenching). Examples of coextrusion methods known in the art include but are not limited to blown film (annular) coextrusion, slot cast coextrusion and extrusion coating. The flat die or slot cast process include extruding polymer streams through a flat or slot die onto a chilled roll and subsequently winding the film onto a core to form a roll of film for further processing.

The term "blown film", as used herein, refers to a film produced by the blown extrusion process. In the blown extrusion process, streams of melt-plastified polymers are forced through an annular die having a central mandrel to form a tubular extrudate. The tubular extrudate may be expanded to a desired wall thickness by a volume of fluid (e.g., air or other gas) entering the hollow interior of the extrudate via the mandrel and then rapidly cooled or quenched by any of various methods known in the art.

The terms "laminate", "lamination", and "laminated", as used herein, refer to a plurality of films that may be attached to each other through various laminating methods as known in the art. The term "attached", as used herein, refers to materials adhering two surfaces to one another, such as the planar surfaces of two films. Laminating methods include, but are not limited to, thermal lamination, adhesive lamination, adhesive-less lamination, extrusion lamination, and extrusion coating.

The term "layer", as used herein, refers to a structure of a single polymer-type or a homogenous blend of materials. A layer may be a single polymer, a blend of materials within a single polymer type or a blend of various polymers, may contain metallic materials, and may have additives. A layer may be continuous with the film, discontinuous or patterned.

Packaging Film

The packaging film of the present disclosure may be coextruded and multilayered. One of the layers of the packaging film includes a blended composition of EVOH and polyethylene (EVOH-polyethylene blend) that demonstrates improved machine directional linear tear, in other words, a machine directional linear tear (MDLT) layer.

As used herein, the terms "ethylene vinyl alcohol copolymer", "EVOH copolymer", and "EVOH", refer to copolymers comprised of repeating units of ethylene and vinyl alcohol. Ethylene vinyl alcohol copolymers may be represented by the general formula: $[(CH_2—CH_2)_n—(CH_2—CH(OH))_m]$. Ethylene vinyl alcohol copolymers may include saponified or hydrolyzed ethylene vinyl acetate copolymers. In commercial grades of EVOH, the extent of saponification is very high (generally at least 97 percent), such that the presence of any unsaponified vinyl acetate groups is typically ignored. The EVOH composition is usually expressed in terms of its ethylene content and for commercial grades used in packaging applications, the ethylene content may range from 24 mole percent to 50 mole percent, though even broader compositions are produced for other applications. EVOH is commercially available in resin form with various percentages of ethylene.

In an embodiment, the EVOH may be present in the EVOH-polyethylene blend in an amount from 60 percent to 95 percent, 65 percent to 90 percent, and more specifically, 70 percent to 80 percent by weight of the film layer that includes the EVOH-polyethylene blend.

Polyethylene may be categorized as a type of polyolefin. The term "polyolefin", as used herein, refers to homopolymers or copolymers, including, for example, bipolymers, terpolymers, etc., having a methylene linkage between monomer units which may be formed by any method known to those having skill in the art. Non-limiting examples include polyethylenes, copolymers of ethylene and polar groups, ionomers, functional group-modified polymers including, e.g., anhydride-modified polyolefins, propylene and butene-1 homopolymers including polypropylene and polybutene-1 as well as copolymers of varying proportions of ethylene, propylene and butene-1 are useful.

Polyethylene is the name for a polymer whose basic structure is characterized by the chain $—(CH_2—CH_2—)_n$. As used herein, the term "polyethylene" includes homopolymers and copolymers of ethylene. Polyethylene homopolymer is generally described as being a solid which has amorphous and crystalline phases with a density of between 0.870 to 0.980 grams per cubic centimeter. The relative crystallinity of polyethylene is known to affect its physical properties. The amorphous phase imparts flexibility and high impact strength while the crystalline phase imparts a high softening temperature and rigidity.

There are several broad categories of polymers and copolymers referred to as "polyethylene". Placement of a particular polymer into one of these categories of polyethylene is frequently based upon the density of the polyethylene and often by additional reference to the process by which it was made since the process often determines the degree of branching, crystallinity and density. In general, the nomenclature used is nonspecific to a compound but refers instead to a range of compositions. This range often includes both homopolymers and copolymers.

"High density polyethylene" (HDPE) is ordinarily used in the art to refer to both (a) homopolymers of densities between about 0.960 to 0.980 grams per cubic centimeter and (b) copolymers of ethylene and an a-olefin (usually 1-butene, 1-hexene or 1-octene) that have densities between 0.940 and 0.958 grams per cubic centimeter. HDPE includes polymers made with Ziegler, Phillips or single site, e.g. metallocene, type catalysts.

"Medium density polyethylene" (MDPE) typically has a density from 0.928 to 0.940 grams per cubic centimeter. Medium density polyethylene includes linear medium density polyethylene (LMDPE).

Another grouping of polyethylene is "high pressure, low density polyethylene" (LDPE). LDPE is used to denominate branched homopolymers having densities between 0.915 and 0.930 grams per cubic centimeter. LDPEs typically contain short and long branches off the main chain (often termed "backbone").

Several copolymers of ethylene and at least one alpha-olefin or "ethylene alpha-olefin copolymers" are referenced throughout this application. Ethylene alpha-olefins refer to a modified or unmodified copolymer produced by the co-polymerization of ethylene and any one or more alpha-olefins. Suitable alpha-olefins include, for example, $C_3$ to $C_4$) alpha-olefins such as 1-propene, 1-butene, 1-pentene, 1-hexene, 1-octenes 1-decene, or blends of such materials. The co-polymerization of ethylene and an alpha-olefin may be produced by heterogeneous catalysis, such as co-polymerization reactions with Ziegler-Natta catalysis systems, homogeneous catalysis, such as co-polymerization reactions with metallocene catalysis systems, single site and constrained geometry catalysts. Homogeneous catalyzed copolymers of ethylene and alpha-olefin may include modified or unmodified ethylene alpha-olefin copolymers having a long-chain branched (i.e., 8-20 pendant carbons atoms) alpha-olefin co-monomer, linear copolymers, or modified or unmodified ethylene alpha-olefin copolymers having a short-chain branched (i.e., 3-6 pendant carbons atoms) alpha-olefin co-monomer. Ethylene alpha-olefin copolymers may include, for example, linear low density polyethylene (LLDPE), metallocene-catalyzed LLDPE (mLLDPE), very low density polyethylene (VLDPE), metallocene-catalyzed VLDPE (mVLDPE), ultra low density polyethylene (ULDPE) and plastomers. In some embodiments, linear low density polyethylene (including LLDPE and mLLDPE) may have a density of from 0.910 $g/cm^3$ to 0.945 $g/cm^3$. In some embodiments, very low density and ultra low density polyethylene (including VLDPE, mVLDPE, and ULDPE) may have a density of from 0.870 $g/cm^3$ to 0.920 $g/cm^3$. Sometime VLDPE's having a density less than 0.900 $g/cm^3$ are referred to as plastomers.

Other examples of polyethylene copolymers include, but are not limited to, ethylene vinyl acetate copolymer (EVA), ethylene methyl acrylate copolymer (EMA), ethylene acrylic acid (EAA), and cyclic olefin copolymers (COC). Other polymers may include ionomers, and functional group-modified polymers including, e.g., anhydride-modified polyolefins.

In some embodiments, the polyethylene used in the EVOH-polyethylene blend may include, polyethylene, low density polyethylene, linear low density polyethylene, very low density polyethylene, ultra-low density polyethylene, medium density polyethylene, ethylene vinyl acetate (EVA), cyclic olefin copolymers (COC), high density polyethylene, and the like.

In an embodiment, polyethylene may be present in the EVOH-polyethylene blend in an amount from 5 percent to 40 percent, 10 percent to 35 percent, and more specifically, 20 percent to 30 percent by weight of the film layer that includes the EVOH-polyethylene blend.

In an embodiment, the packaging film that includes the MDLT layer, may include the EVOH-polyethylene blend in the following ratios of EVOH to polyethylene, respectively, by weight of the MDLT layer: 95:5, 90:10, 85:15, 80:20, 75:25, 70:30, 65:35, or 60:40.

It should be understood that the packaging film layer that includes the EVOH-polyethylene blend can further include processing additives or be blended with other materials, such as, but not limited to, polyolefins, pigments, etc. as is known in the art. The terms "processing aids" or "processing additives", as used herein, refer to antilock agents, slip agents, stabilizing agents, release agents, lubricating agents, antioxidants, photoinitiators, primers, colorants, compatibilizers for film recycling capabilities, and other additives known to and used by a person of ordinary skill in the art without undue experimentation. The use of processing aids varies depending on the equipment, materials, desired aesthetics, desired performance properties, etc.

Further, the packaging film may be formable film, non-formable film, shrinkable film, or non-shrinkable film as are generally known by a person of ordinary skill in the art. The terms "formable" or "thermoformed", as used herein, refer to polymeric film that is permanently formed into a desired shape by the application of a differential pressure between the film or sheet and a mold, by the application of heat, by the combination of heat and the application of a differential pressure between the film or sheet and a mold, or by any thermoforming technique known to those skilled in the art. The term "non-formable", as used herein, refers to polymeric film that is flexible and not permanently formed into a shape by any thermoforming technique.

The term "shrinkable" as used herein, refers to shrinkage of greater than 5 percent in either the transverse or machine direction of the film. The term "non-shrinkable" as used herein, refers to shrinkage of 5 percent or less in either the transverse or machine direction of the film.

The term "shrinkage" as used herein, refers to the use of a polymeric, packaging film manufactured in such a way that when it is exposed to a certain amount of heat, the film will contract in at least one direction along its length (machine direction) or width (transverse direction), preferably in both directions, reducing its overall surface area. Shrinkage values are obtained by measuring unrestrained (free) shrink of a 10 cm square specimen immersed in a water bath. Four test specimens are cut from a given sample of the film to be tested. Specimens are cut into squares of 10 cm in the machine direction (MD) of the film by 10 cm in the transverse direction (TD) of the film. Each specimen is completely immersed for 5 seconds in a 90 degrees Celsius water bath. The specimen is removed from the bath and the distance between the ends of the shrunken specimen is measured for both the MD and TD of the film specimen. The difference in the measured distance for the shrunken specimen and each original 10 cm side is multiplied by ten to obtain the percent of shrinkage for the specimen for each direction. The MD shrinkage for the four specimens is averaged for the MD shrinkage value and the TD shrinkage for the four specimens is averaged for the TD shrinkage value.

Shrinkable films are produced through orientation of the film to make an oriented film. The term "oriented" as used herein, refers to a film, sheet, web, etc. that has been elongated in at least one of the machine direction or the transverse direction. Such elongation is accomplished by procedures known in the art. The oriented film may be extruded using either flat or annular die type processes.

Orientation of the film may be mono-directional (machine direction or transverse direction) or bi-directional. The film is stretched that increases the machine direction and/or transverse direction dimension and subsequently decreases the thickness of the material. Bi-directional orientation may be imparted to the film simultaneously or successively. Generally, stretching in either or both directions is subjected to the film in the solid phase at a temperature just below the melt temperature of the polymers in the film. In this manner, the stretching causes the polymer chains to "orient", changing the physical properties of the film. At the same time, the stretching thins the film. The resulting films are thinner and can exhibit significant changes in mechanical properties such as toughness, heat resistance, stiffness, tear strength and barrier. One of skill in the art may recognize that for predominantly amorphous polymers, $T_g$ establishes the stretching temperature. For polymers with an appreciable level of crystallinity, $T_m$ drives the stretching temperature.

In an embodiment that is shown in FIG. 1, a packaging film 10 may be a coextrusion of a MDLT layer 12 and a second layer 14. The second layer 14 may be a sealant layer. The MDLT layer 12 and the second layer 14 having a sealing surface 16 may be adjacent to each other as shown. The terms "adjacent" or "directly adjacent", as used herein, refer to the lack of an intervening material between the components (e.g., MDLT layer 12 and second layer 14). The MDLT layer 12 includes an amount of EVOH from 60 percent to 95 percent blended with an amount of polyethylene from 5 percent to 40 percent by weight of the MDLT layer 12.

The terms "sealant", "seal layer", "sealing layer", "heat seal layer", and "sealant layer", as used herein, refer to a film layer, or layers, involved in the sealing of the film: 1) to itself, 2) to another film layer of the same film, 3) to another film that may be a polyolefin, and/or 4) to another article that includes a non-polymeric material, such as aluminum, or a component, for example, a tray or a cup. In general, the sealant layer is a surface layer, that is, an exterior or an interior layer of any suitable thickness, that provides for the sealing of the film to itself or another layer or film or component. For example, the exposed surface that is the sealing surface 16 of the second layer 14 may seal to itself or to another polymer-based film or component.

The term "seal", as used herein, refers to the union of a surface (or portion thereof) of one film to a surface (or portion thereof) of another film or two different portions of a surface of the same film (e.g., sealing surface 16 to sealing surface 16). Seals may be formed by any known method including heat sealing, ultrasonic sealing, RF welding, etc.

Polyolefins other than the polyethylenes previously described may include propylene and butene-1 homopolymers including polypropylene and polybutene-1 as well as copolymers of varying proportions of ethylene, propylene and butene-1.

The polypropylene copolymers referred to herein may include impact, random, block and/or grafted copolymers, and may include more than two repeating components wherein the dominant monomer is propylene. Those skilled in the art will appreciate that polypropylene copolymers are distinctly different than propylene homopolymers that do not include a different monomer other than propylene and are also distinctly different than polyethylene copolymers. Non-limiting examples of the polypropylene copolymer include random copolymer of polypropylene and ethylene, olefin block copolymers and heterophasic polypropylene copolymers or polypropylene impact copolymers.

Figure 2:
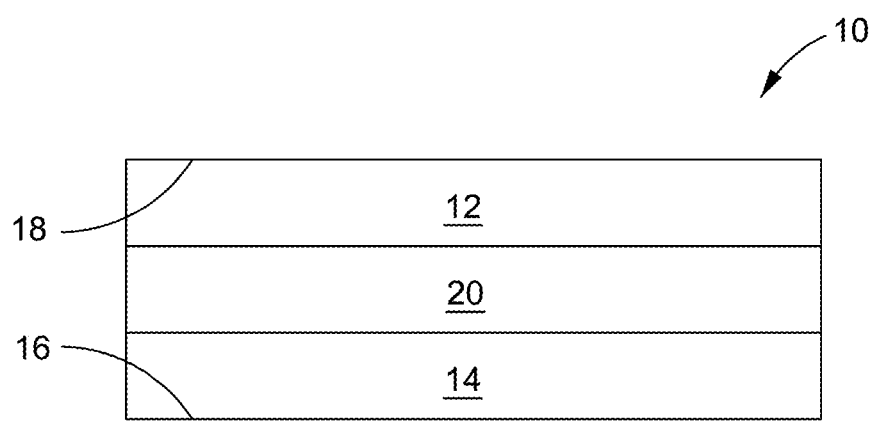
FIG. 2 illustrates a cross-sectional view of a second embodiment of a multilayer packaging film disclosed herein.

The packaging film 10 can optionally include one or more additional layers that may be coextruded with the MDLT layer 12 and the second layer 14. In an embodiment shown in FIG. 2, a first additional layer 20 may be positioned between the MDLT layer 12 and the second layer 14 such that the MDLT layer 12 and the second layer 14 are non-adjacent to each other. The term "non-adjacent", as used herein, refers to an intervening material positioned between two components. In another embodiment shown in FIG. 3, a first additional layer 20 may be positioned onto the MDLT layer exterior surface 18. The term "exterior surface", as used herein, refers to one of two major surfaces of a layer that is oriented away from the second layer 14. The term "interior surface", as used herein, refers to one of two major surfaces of a layer that is oriented towards the second layer 14.

Figure 4:
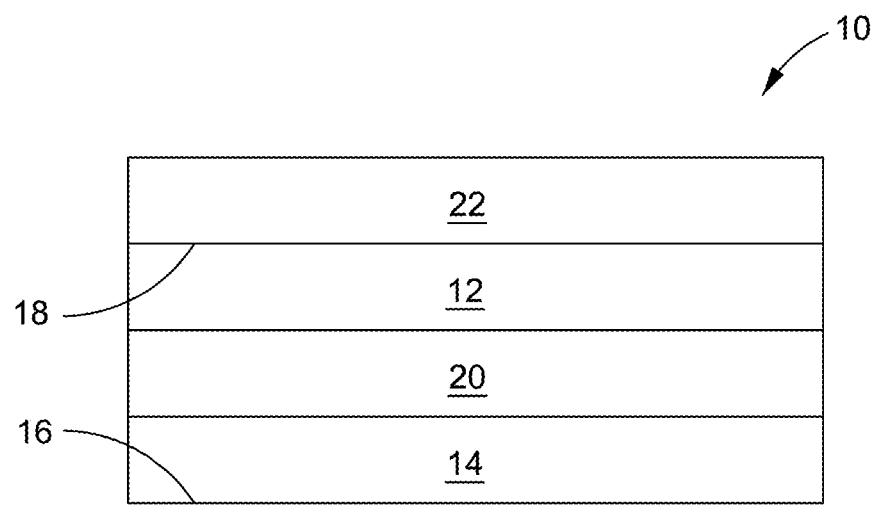
FIG. 4 illustrates a cross-sectional view of a fourth embodiment of a multilayer packaging film disclosed herein.

The packaging film 10 may include more than one additional layer. The additional layers may be coextruded with the MLDT layer 12 and the second layer 14. In an embodiment shown in FIG. 4, the first additional layer 20 may be positioned between the MLDT layer 12 and the second layer 14. The second additional layer 22 may be positioned onto the MDLT layer exterior surface 18. In another embodiment shown in FIG. 5, the first additional layer 20 and the second additional layer 22 may both be positioned between the MLDT layer 12 and the second layer 14. It should be understood, that in some embodiments, the packaging film 10 may include additional layers 20, 22 as applicable for the final application of the packaging film 10 that may be a gas barrier layer, a moisture barrier layer, adhesive (tie) layers, or other as desired.

Figure 3:
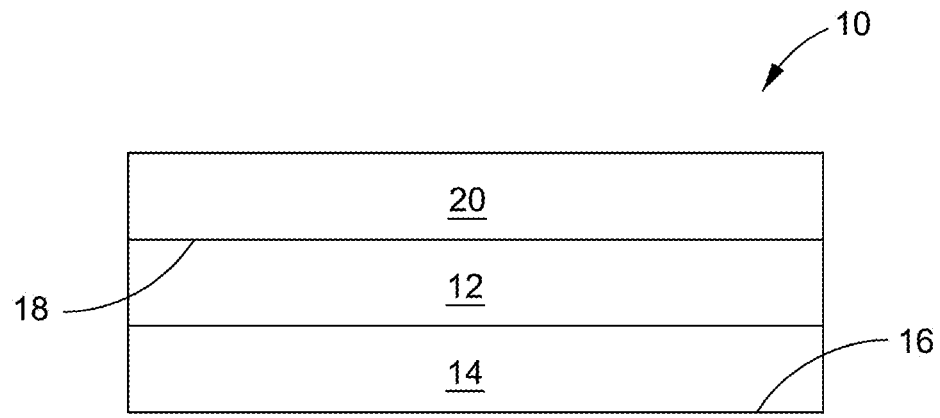
FIG. 3 illustrates a cross-sectional view of a third embodiment of a multilayer packaging film disclosed herein.
Figure 5:
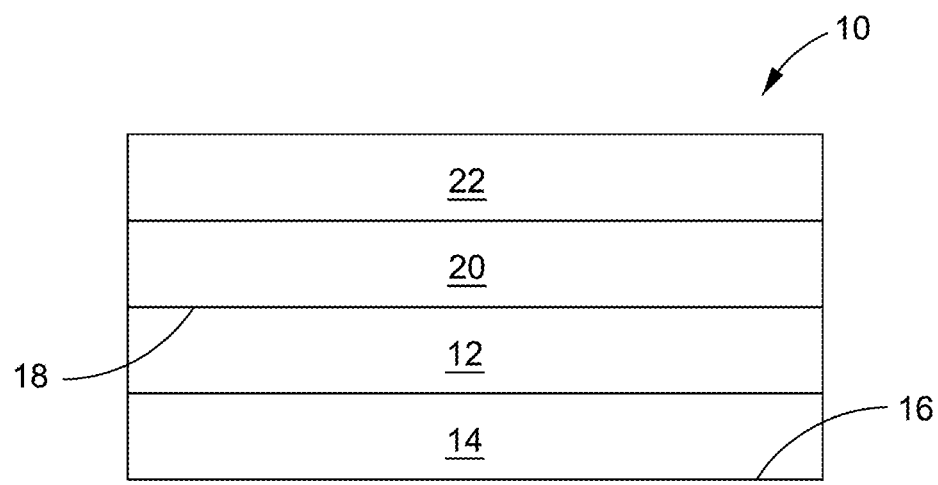
FIG. 5 illustrates a cross-sectional view of a fifth embodiment of a multilayer packaging film disclosed herein.

Any subsequent additional layer may be positioned onto the exterior surface of the adjacent layer in a manner similar to how the first additional layer 20 is positioned onto the MDLT layer exterior surface 18 as shown in FIGS. 3 and 5, and that is generally known by one skilled in the art. It should be understood that the packaging film 10 may include any number of additional layers 20, 22. The packaging film 10 may include one additional layer 20, 22, two additional layers 20, 22, three additional layers 20, 22, four additional layers 20, 22, five additional layers 20, 22, six additional layers 20, 22, seven additional layers 20, 22, eight additional layers 20, 22, nine additional layers 20, 22, ten additional layers 20, 22, and so on.

The additional layer(s) 20, 22 may function as a barrier layer. Barrier polymers or barrier materials are generally known to reduce the transmission of a gas or water vapor through the film. Barrier materials may be required for some embodiments where the packaging film 10 will be used to package product, such as food, in order to preserve quality of the packaged product through distribution and to extend shelf life. In some instances, a moisture barrier is required to prevent a product from drying out (losing moisture content). In other instances, an oxygen barrier is required to prevent ingress oxygen from degrading a product prematurely. In some embodiments, the additional layer(s) 20, 22 may be composed of, but not limited to, polyamide (PA), polyamide blends, ethylene vinyl alcohol copolymer (EVOH), polyvinyl chloride, polyvinylidene chloride, glass, thermoplastic polyurethane (TPU), polyester, e.g., polyethylene terephthalate (PET), high density polyethylene (HDPE), polypropylene, and may be blends thereof.

A moisture barrier is preferably selected to limit or slow the ingress of moisture. Packaging that includes a moisture barrier can prevent a product from losing moisture content. For example, a film may comprise a moisture barrier having a moisture permeability that is low enough to prevent deleterious effects upon packaged articles. In some embodiments, the moisture barrier may be composed of, but not limited to metal, metal oxide depositions, such as aluminum oxide or silicon oxide, and polymers such as, halogenated polymers, for example, PVdC or PCTFE, and polyolefins, for example, HDPE, polypropylene (PP) and COC.

The terms "polyamide" or "nylon", as used herein, refer to homopolymers or copolymers having recurring amide linkages and may be formed by any method known in the art. Recurring amide linkages may be formed by the reaction of one or more diamines and one or more diacids. Non-limiting examples of suitable diamines include 1,4-diamino butane, hexamethylene diamine, decamethylene diamine, metaxylylene diamine and isophorone diamine. Non-limiting examples of suitable diacids include terephthalic acid, isophthalic acid, 2,5-furandicarboxylic acid, succinic acid, adipic acid, azelaic acid, capric acid and lauric acid.

Polyamides may also be formed by the ring-opening polymerization of suitable cyclic lactams like ε-caprolactam, ω-undecanolactam and ω-dodecalactam. Non-limiting examples of suitable polyamides include poly(ε-caprolactam) (nylon 6), poly(ω-undecanolactam) (nylon 11), poly(ω-dodecalactam) (nylon 12), poly(hexamethylene adipamide) (nylon 6,6), poly(hexamethylene adipamide-co-caprolactam) (nylon 66/6), poly(caprolactam-co-hexamethylene adipamide) (nylon 6/66), poly(caprolactam-co-hexamethylene azelamide) (nylon 6/69), poly(m-xylylene adipamide) (MXD6) and poly(hexamethylene terephthalamide-co-hexamethylene isophthalamide) (nylon 6I/6T).

Further, the "ethylene vinyl alcohol copolymer" or "EVOH" that has been previously described is known to be a highly effective oxygen barrier. EVOH copolymers that have increasing mole percentages of ethylene generally have greater gas permeabilities that are dependent on factors such as relative humidity and the nature of the permeating gas. It is expected that processability and orientation would be facilitated at higher ethylene contents; however, gas permeabilities, particularly with respect to oxygen, may become undesirably high for certain packaging applications that are sensitive to microbial growth in the presence of oxygen. Conversely lower ethylene contents may have lower gas permeabilities, but processability and orientation may be more difficult. Further, a person having ordinary skill in the art would understand that a film including an EVOH layer that is relied upon as a gas barrier would generally not be blended and is 100 percent EVOH. It is also known to blend EVOHs with different mole percentages of ethylene, e.g., 38 mole percent may be blended with 27 mole percent, to blend EVOH with polyamides or with platy minerals to achieve good barrier. However, some applications include EVOH blended with a polyolefin at 50 percent or less of EVOH by weight of the barrier layer. For example, the gas barrier layer may include 40, 30, 20, or even 10 percent EVOH by weight to provide gas barrier properties.

A packaging film 10 in accordance with the present disclosure, may have an oxygen transmission rate (OTR). While generally preferable to have a lower OTR in some applications, there may be applications that the packaging film 10 is not required to have an oxygen barrier. In embodiments, the OTR may be from 0.15 cc/m$^2$/24 hours to 0.5 cc/m$^2$/24 hours at 23 degrees Celsius, 0 percent RH and 1 atmosphere.

The term "polyester", as used herein, refers to homopolymers and copolymers having recurring ester linkages which may be formed by any method known in the art. Recurring ester linkages may be formed by the reaction of one or more diols with one or more diacids. Non-limiting examples of suitable diols include ethylene glycol, diethylene glycol, 1,3-propanediol, 1,4-butanediol, resorcinol, 1,4-cyclohexanedimethanol, 2,2,4,4-tetramethyl-1,3-cyclobutanediol, and polyoxytetramethylene glycol. Non-limiting examples of suitable diacids include terephthalic acid, isophthalic acid, 2,6-naphthalene dicarboxylic acid, 2,5-furandicarboxylic acid, 1,4-cyclohexane dicarboxylic acid, trimellitic anhydride, succinic acid, adipic acid and azelaic acid.

Non-limiting examples of suitable polyesters include poly(ethylene terephthalate) (PET), poly(ethylene terephthalate-co-cyclohexanedimethanol terephthalate) (PETG), poly(butylene terephthalate) (PBT), poly(ethylene naphthalate) (PEN), poly(ethylene furanoate) (PEF), poly(propylene furanoate) (PPF) and poly(butylene adipate-co-terephthalate) (PBAT).

Suitable polyesters may also be formed by the ring-opening polymerization of suitable cyclic monomers like lactides to form, for example, poly(lactic acid) (PLA), glycolides to form, for example, poly(glycolic acid) (PGA) and lactones to form, for example, poly(caprolactone) and poly(butyrolactone).

Suitable polyesters may also be formed by the direct condensation reaction of alpha hydroxy acids. For example, PGA may be formed by the condensation reaction of glycolic acid.

Suitable polyesters may also be synthesized by microorganisms. Examples of suitable polyesters include various poly(hydroxy alkanoates) like poly(hydroxy butyrate) (PHB) and poly(hydroxy valerate) (PHV).

The additional layer(s) 20, 22 can alternatively be an abuse resistance layer, bulk layer, odor or oxygen scavenging layer, or provide any other desired property for the end-use of the packaging film 10. Non-limiting examples of applicable materials include polyethylene, low density polyethylene, linear low density polyethylene, very low density polyethylene, ultra-low density polyethylene, medium density polyethylene, high density polyethylene, ethylene/propylene copolymers, polypropylene, or propylene/ethylene copolymer, ethylene vinyl acetate (EVA), or cyclic olefinic copolymers.

The packaging film 10 can include one or more adhesive layers, also known in the art as "tie layers", which can be selected to promote the adherence of adjacent layers to one another in a multilayer film. The terms "tie layer", "adhesive layer" or "adhesive coating", as used herein, refer to a material placed on one or more layers, partially or entirely, to promote the adhesion of that layer to another surface. Preferably, adhesive layers or coatings are positioned between two layers of a multilayer film to maintain the two layers in position relative to each other and prevent undesirable delamination. Unless otherwise indicated, a tie layer or an adhesive layer or coating can have any suitable composition that provides a desired level of adhesion with the one or more surfaces in contact with the adhesive layer material. Optionally, a tie layer or an adhesive layer or coating placed between two layers may include components of each of the layers to promote simultaneous adhesion of the adhesive layer to both the layers, each on opposite sides of the adhesive layer. Tie layers, as generally known by a person of ordinary skill in the art, may be incorporated into the packaging film 10 as appropriate. Multilayer films can comprise any suitable number of tie or adhesive layers of any suitable composition. Various adhesive layers are formulated and positioned to provide a desired level of adhesion between specific layers of the film according to the composition of the layers contacted by the tie layers.

In embodiments where the layers comprise compatible polymers, the layers can be coextruded without the need for an intermediate adhesive (tie) layer.

It is desirable that the thickness of the packaging film 10 be selected to provide the desired combination of the performance properties sought, e.g., with respect to, oxygen permeability, delamination resistance, moisture barrier properties, etc. The packaging film 10 has a thickness that includes the thickness of the MDLT layer 12, the second layer 14, any optional additional layer(s) 20, 22, and any tie layers that may be present. The packaging film 10 that comprises a multilayer film or any single layer of the multilayer film can have any suitable thicknesses, preferably from 25.4 microns to 203 microns (1 mil to 8 mil), or any increment therebetween. In an embodiment, the thickness can be from 20 microns to 254 microns (0.8 mil to 10.0 mil), from 30 microns to 245 microns, from 40 microns to 235 microns, from 50 microns to 225 microns, from 60 microns to 215 microns, from 70 microns to 205 microns, from 80 microns to 195 microns, from 90 microns to 185 microns, from 100 microns to 175 microns, from 110 microns to 165 microns, from 120 microns to 155 microns, or from 130 microns to 145 microns. For example, in a non-limiting embodiment, the packaging film 10 may be a blown film and the thickness may be from 51 microns to 152 microns (2.0 mil to 6.0 mil). In another non-limiting embodiment, the packaging film 10 may be a shrinkable film and the thickness may be from 25.4 microns to 102 microns (1.0 mil to 4.0 mil). Additionally, the packaging film 10 may be opaque, transparent and/or include printing or graphics.

Various additives may be incorporated into or coated onto the polymers utilized in one or more layers (the MDLT layer 12, the second layer 14, any optional additional layers 20, 22, or tie layers) of the packaging film 10 of the present disclosure. Non-limiting examples of optional additives include processing aids, antiblock agents, slip agents, stabilizing agents, release agents, lubricating agents, antioxidants, photoinitiators, primers, natural and synthetic colorants, pigments and dyes, fillers such as calcium carbonate or carbon black, antimicrobial agents, compatibilizers, and other additives known to and used by a person of ordinary skill in the art without undue experimentation. The use of optional additives varies depending on the equipment, materials, desired aesthetics, etc.

In various non-limiting embodiments, the packaging film 10 may be a coextruded, blown film and include the structures listed below:

EVOH-VLDPE blend/tie/LLDPE
LDPE/tie/EVOH-VLDPE blend/tie/LLDPE
LDPE-LLDPE blend/tie/EVOH-VLDPE blend/tie/LLDPE
LDPE-LLDPE blend/tie/EVOH-MDPE blend/tie/LLDPE
LDPE-LLDPE blend/tie/EVOH-LDPE blend/tie/LLDPE
LDPE-LLDPE blend/tie/EVOH-EVA blend/tie/LLDPE
LDPE-LLDPE blend/tie/EVOH-LDPE-LLDPE blend/tie/LLDPE In various non-limiting embodiments, the packaging film 10 may be a coextruded, oriented, shrinkable film and include the structures listed below:

VLDPE-EVA blend/tie/EVOH-LLDPE blend/tie/plastomer
VLDPE/tie/EVOH-LLDPE blend/tie/plastomer PA/tie/EVOH-LLDPE blend/tie/plastomer
VLDPE-EVA blend/COC tie/EVOH-LLDPE blend/COC tie/plastomer
PA/COC tie/EVOH-LLDPE blend/COC tie/plastomer The inventors of the present disclosure have surprisingly discovered that the EVOH-polyethylene blend, as disclosed, improves machine directional tear of the packaging film 10. While not being bound by theory, the inventors subscribe to the belief that the EVOH-polyethylene blend in the MDLT layer 12 disrupts the interchain, hydrogen bonding of the EVOH that allows for easier and/or straighter tear in the machine direction of the packaging film 10. Heretofore, a person having ordinary skill in the art generally knew that a coextruded film including a layer that includes EVOH has the propensity to tear straight in the transverse direction of the film and is resistant to tearing in the machine direction.

Packaging Film Package

The packaging film 10 may be fabricated into any type of hermetically sealed package format including, but not limited to bags, pouches, sachets, flow wrap, bulk bag, chub, tray and lid, VSP, or the like as is generally known in the packaging arts. The packaging film 10 may be used to package any type of product including, but not limited to dry foods, liquids, meats, cheese, nuts, candy, snacks, fresh foods, frozen foods, beverages, pharmaceuticals, nutraceuticals, cosmetics, hard-to-hold products, cleaners, chemicals, wipes, medical products, electronic devices, pet foods/treats, bulk products, etc.

The terms "hermetic seal" or "hermetically sealed", as used herein, refer to a seal that is maintained against the flow of air or fluid, in other words, an airtight or liquid proof seal.

In some embodiments of packages, the packaging film 10 is used as at least one of the side walls of the package, or in some cases, all of the side walls. A pouch or bag may be sealed in a fin seal or lap seal configuration. In one non-limiting embodiment, the package may be in the form of a stand-up pouch using the packaging film 10 as the side walls. Fitments or other closures may be sealed to any part of the packaging film 10. In another non-limiting embodiment, the packaging may be a VSP. While a formed tray may not readily tear, the packaging film 10 contributes to making the VSP package easy to open by tearing the packaging film 10 from the tray. In many instances, the opening feature of the package, e.g., where the package is to be torn open, is in the machine direction of the packaging film 10.

The packages may further include a tear initiator in the packaging film 10. The tear initiator may be a continuous or non-continuous series of holes, slits, slots, perforations, notches, punctures, orifices, openings, gaps, scratches, scores, knurls, surface-roughened portions, or otherwise as known in the art. In various embodiments, the tear initiator may be formed by mechanical means (e.g., using a cutting blade), by chemical means (e.g., using solvents), by thermal means (e.g., by optical ablation including but not limited to laser), or by other means known in the art. In various embodiments, the tear initiator has varying depth, and in some embodiments, extends through the entire thickness of the packaging film 10. Such tear initiators may be used on one or more edges or portions of the disclosed packages. Additionally, in various embodiments, the tear initiator may be of varying length.

Furthermore, in various non-limiting embodiments, the tear initiator has various slopes (i.e., lines with equations that may be written in slope intercept form, y=mx+b). In some embodiments, the tear initiator may have an undefined slope (i.e., as a vertical line). In other embodiments, the tear initiator may have a positive slope, a negative slope or a zero slope (i.e., as a horizontal line). In some embodiments, the tear initiator may be non-linear.

The packages formed from the packaging film 10 may include features that assist the user in gripping or holding the package with less difficulty than if the package did not include an assist feature formed into the packaging film 10. In some embodiments, a non-limiting assist feature includes a handle or finger holes where material has been removed from the packaging film 10 to create an opening or hole in the packaging film.

A particular package format that may be formed from the packaging film 10 is a shrink bag. The packaging film 10 of this embodiment includes a minimum of 5 percent free shrink in each direction (the MD or the TD). Shrink bag packaging is commonly used for food, such as meat or cheese, and other items. Processed or whole meat may be packaged in shrink film packaging that does not include a removable portion but is torn open to access the contents. The bags are typically pre-manufactured having a first seal at or near a first end of the bag, the food is placed inside the bag, the bag is sealed closed at a second end of the bag, and then heat shrunk to shrink the film around the food. The bags may incorporate various features that may include assist features, tear initiators, and/or tack seals to prevent curling of the packaging film 10 after shrinkage, among others.

Current tear-open, shrink bags suffer from inconsistent performance when the tear propagates through the seal at the first end of the bag and follows either the leading or trailing bead of the seal to the edge of the bag. As a result, the bag is not opened at all (the tear remains above the seal/tear diverges into header), or the bag has not been opened enough by the tear for the contents to be removed.

Figure 6:
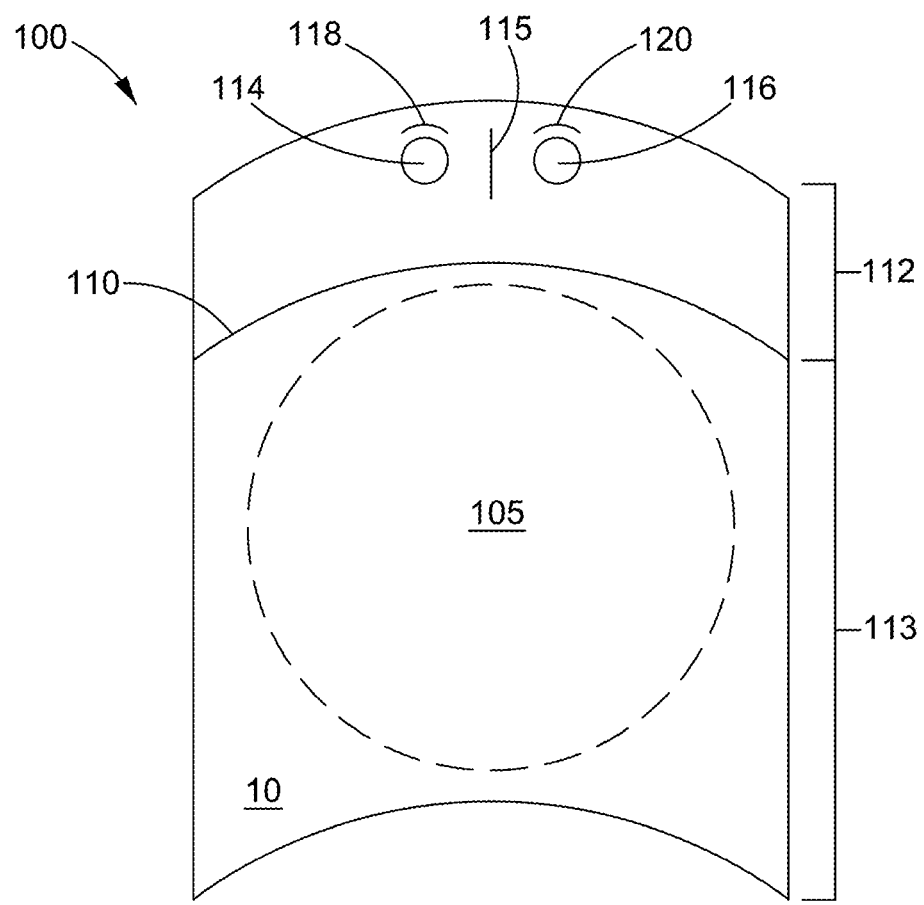
FIG. 6 illustrates a top view of a package in the form of a shrink bag disclosed herein.

In one embodiment, the packaging film 10 is formed into a shrink bag package 100 as shown in FIG. 6. Food 105 is placed into the bag 100. The bag 100 is sealed with a top seal 110 where a header area 112 is formed above the top seal 110 and a product space portion 113 is formed below the top seal 110. The bag 100 further includes a tear initiator 115 in the form of slits, assist features in the form of finger holes 114, 116, and tack seals 118, 120. The bag 100 is then exposed to heat to shrink the packaging film 10 to be in closer proximity to the food 105 contained therein as shown in FIG. 7.

Figure 7:
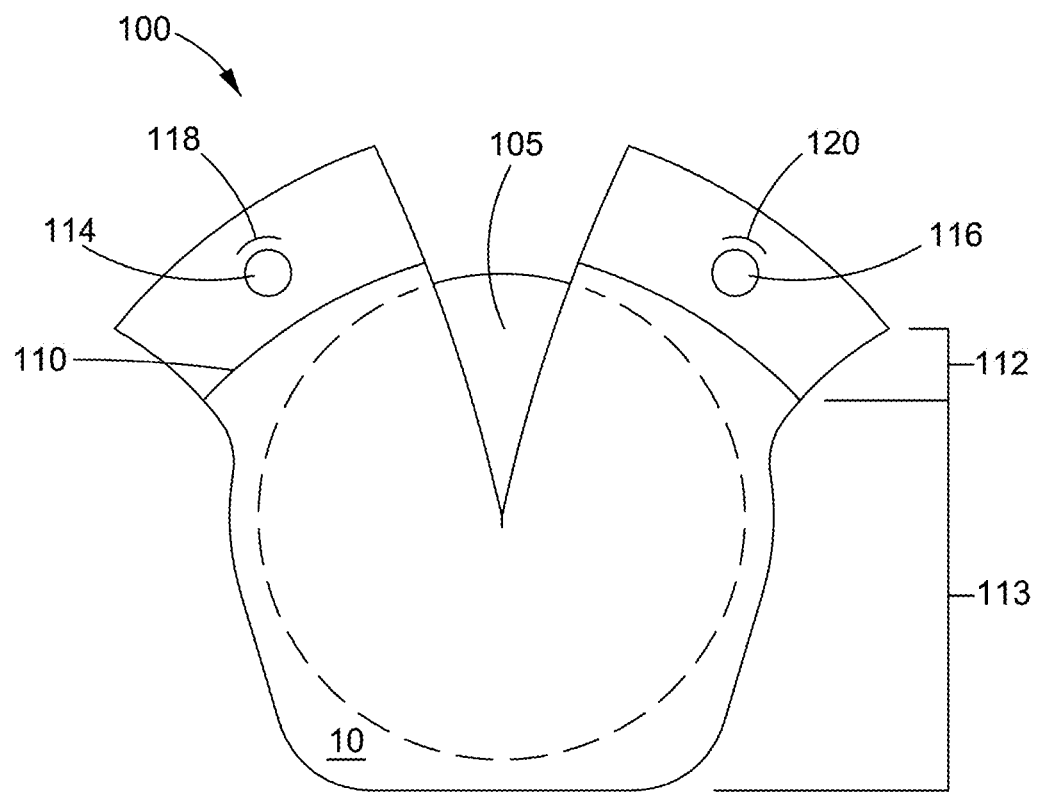
FIG. 7 illustrates is a top view of the shrink bag shown in FIG. 6 in an opened state.

The bag 100 is opened by pulling the finger holes 114, 116 away from each other as is also shown in FIG. 7. A tear that has propagated linearly in the machine direction beyond the tear initiator 115 and into the product space portion 113 of the bag 100 is shown.

One indicator of machine directional linear tear for a package is the angle of tear of the packaging film. The angle of tear is measured on specimens of the packaging film that have undergone Trouser Tear testing. The Standard Test Method for Tear-Propagation Resistance (Trouser Tear) of Plastic Film and Thin Sheeting by a Single-Tear Method, ASTM 1938-08, is a method of measuring the force to propagate a tear of the packaging film. The test method was conducted with the modifications described in the Test Methods section of the present application that produced tear force and tear angle data. The tear angles were recorded as positive values to indicate if the specimen tore to the right and as negative values if the specimen tore to the left. By using both positive and negative values when measuring the tear angles, the tendency of the film to tear diagonally in one direction versus another can be characterized. The average of the tear angles can be calculated and is referred to as the Simple Average of the Tear Angles. The Trouser Tear Angle Average of the Absolute Values differs from the Trouser Tear Angle Simple Average of the tear angles. The Simple Average of the tear angles can be misleading as to how far from a straight line the packaging film tears. However, by using both the Average of the Absolute Values and the Simple Average, the severity of the tear angle and the preferential tear toward one direction can be characterized. Further, the standard deviation of the data also provides absolute measures of the variabilities. For example, larger/smaller standard deviations indicate more/less variability of the tear angles, respectively.

The Trouser Tear Angle Average of the Absolute Values of the packaging film can be 2.0 degrees or less when taking the standard deviation of the measurement into consideration. In an embodiment, the Trouser Tear Angle Average of the Absolute Values of the packaging film 10 can be 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1, or 0 degrees, or any value therebetween.

The Trouser Tear Angle Simple Average of the packaging film can be 1.0 degree or less. In an embodiment, the Trouser Tear Angle Simple Average of the packaging film 10 can be 1.0, 0.9, 0.8, 0.7, 0.6, 0.5, 0.4, 0.3, 0.2, 0.1, or 0 degrees, or any value therebetween.

Laminated Packaging Film

Many packages require a layer that contributes to the strength properties of the total film structure, which is often an exterior layer, and provides heat and puncture/abuse resistance, stiffness, clarity and/or high gloss among other things. For example, packaging for such items as meat, cheese, snacks, coffee, and liquids may require these additional properties that are not afforded by the packaging film 10 alone.

In some embodiments, the layer providing strength and heat resistance properties may be an oriented polymer film. The oriented film may be monoaxially oriented or biaxially oriented (isotropic). Non-limiting examples of the oriented, monolayer, polymer film may consist essentially of polyester, polyamide, polypropylene, or polyethylene. For example, the films may be of oriented polyester (OPET), biaxially oriented polyester (BOPET), oriented polyamide (BON), oriented polypropylene (OPP), biaxially oriented polypropylene (BOPP), or oriented polyethylene, or biaxially oriented polyethylene.

Figure 8:
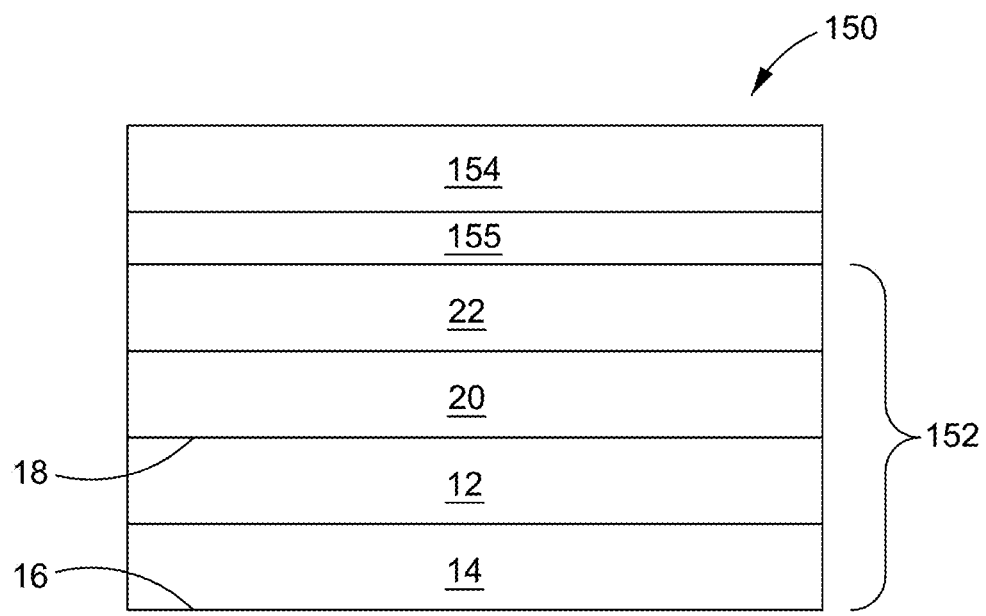
FIG. 8 illustrates a cross-sectional view of a laminated packaging film disclosed herein.

With reference to FIG. 8, a first film 152 and a second film 154 may be attached to each other through various laminating methods as known in the art to form a laminated packaging film 150. In an embodiment, the first film 152 and the second film 154 may be joined by a laminating agent 155. The first film 152 is a coextruded, multilayer film wherein one of the layers is a MDLT layer that includes a blended composition of EVOH and polyethylene resins. The first film 152 may be the packaging film 10 as previously described. In any embodiment of the laminated packaging film 150, the first film 152 is the packaging film 10. In an embodiment, the first film 152 may include only the MDLT layer 12 and the second layer 14 or may include the MDLT layer 12, the second layer 14 and any optional, additional layers 20, 22 as desired.

The second film 154 is an oriented film that may be biaxially oriented or monoaxially oriented. In an embodiment, the second film 154 may be any of the oriented films previously described as the "exterior layer". In an embodiment, the first film 152 is laminated to the second film 154 by the laminating agent 155 such that the sealing surface 16 is exposed.

In an embodiment, the laminating agent 155 may be an extrusion laminating agent where the parameters for such lamination are expected to be set by one skilled in the art without undue experimentation. For example, the laminating agent 155 may include polyethylenes as previously described that are coating grade. In a non-limiting embodiment, the laminating agent may be low density polyethylene. Further, the laminating agent 155 can be any material and can be added by any known process as long as it does not disrupt the spirit of the disclosure, that is, a laminated packaging film 150 that demonstrates improved machine directional linear tear.

In another embodiment, the laminating agent 155 may be an adhesive laminating agent. Unless otherwise specifically indicated, an adhesive may have any suitable composition that provides a desired level of adhesion with the one or more surfaces in contact with the adhesive. Adhesives may be solvent-based, water-based (also known as waterborne), or solventless. Solvent-based adhesives include an adhesive and at least one solvent and requires the solvent to be removed by evaporation (e.g., drying) after the solvent-based adhesive is applied. Non-limiting examples of solvent-based adhesives include polyurethane-based adhesives such as two-part polyurethane adhesives, including but not limited to those with solids content greater than 30 percent by weight. In general, the adhesives have negligible effect on the thickness of the film.

In various, non-limiting embodiments, the laminated packaging film 150 may be a coextruded, blown film and include the structures listed below, where the designation of "LA" is indicative of a laminating agent:

BON/LA/EVOH-VLDPE blend/tie/LLDPE
OPET/LA/EVOH-VLDPE blend/tie/LLDPE
BOPET/LA/EVOH-VLDPE blend/tie/LLDPE
OPET/LA/LDPE/tie/EVOH-VLDPE blend/tie/LLDPE
OPP/LA/LDPE/tie/EVOH-VLDPE blend/tie/LLDPE
OPET/LA/LDPE-LLDPE blend/tie/EVOH-VLDPE blend/tie/LLDPE
OPET/LA/LDPE-LLDPE blend/tie/EVOH-MDPE blend/tie/LLDPE
OPET/LA/LDPE-LLDPE blend/tie/EVOH-LDPE blend/tie/LLDPE
OPET/LA/LDPE-LLDPE blend/tie/EVOH-EVA blend/tie/LLDPE
OPET/LA/LDPE-LLDPE blend/tie/EVOH-LDPE-LLDPE blend/tie/LLDPE While the second film 154 provides desirable and/or necessary properties to a package formed from a laminated packaging film, the second film 154 can contribute to difficulty in tearing film or tearing open the package formed therefrom. To further explain, a laminated packaging film that does not include an MDLT layer may yield film tear direction that is dominated by the characteristics of the oriented second film 154. Additionally, when the second film 154 is purchased from a supplier, the tear direction of the oriented film can vary depending on the location of the film across the tenter frame oriented roll. For example, film from the center of the roll may provide the straightest MD tear and film from the sides/edges of the roll may have a preference to tear at an angle. When using oriented film as the second film 154 to make the laminated packaging film 150, it is unknown if center-cut rolls or side rolls are being supplied, which further contributes to the inconsistency in tear direction.

The inventors of the present disclosure have discovered that the use of the first film 152 that includes the MDLT layer can influence a straight or nearly straight tear angle of the laminated packaging film 150. In one embodiment, a biaxially oriented film was the second film 154 and was laminated to the first film 152. The resulting laminated packaging film 150 displayed a tendency to tear linearly in the machine direction according to the test methods described herein.

The second film 154 can have any suitable thickness, preferably from 10.0 microns to 75.0 microns (0.4 mil to 3.0 mil), or any increment therebetween. In an embodiment, the thickness can be from 11.0 microns to 65.0 microns, from 12.0 microns to 55.0 microns, from 13.0 microns to 45.0 microns, from 14.0 microns to 35.0 microns, or from 15.0 microns to 25.0 microns, or any value therebetween. Additionally, the second film 154 may be opaque, transparent and/or include printing or graphics.

The laminated packaging film 150 can have any suitable thickness, preferably from 36.0 microns to 280.0 microns (1.4 mil to 11.0 mil). Advantageously, many embodiments may have a thickness from 50.0 microns to 270.0 microns, from 60.0 microns to 260.0 microns, from 70.0 microns to 250.0 microns, from 80.0 microns to 240.0 microns, from 90.0 microns to 230.0 microns, from 100.0 microns to 220.0 microns, from 110.0 microns to 210.0 microns, from 120.0 microns to 200.0 microns, from 130.0 microns to 190.0 microns, from 140.0 microns to 180.0 microns, from 150.0 microns to 170.0 microns, or any value therebetween.

The Trouser Tear Angle Average of the Absolute Value is also an indicator of machine directional linear tear for a package formed from the laminated packaging film 150. The Trouser Tear Angle Average of the Absolute Values of the laminated packaging film 150 can be 5.0 degrees or less. In an embodiment, the Trouser Tear Angle Average of the Absolute Values of the laminated packaging film 150 can be 5.0, 4.9, 4.8, 4.7, 4.6, 4.5, 4.4, 4.3, 4.2, 4.1, 4.0, 3.5, 3.0, 2.5, 2.0, 1.5, 1.0, 0.5, or 0 degrees, or any value therebetween.

The Trouser Tear Angle Simple Average of the packaging film 150 can be 1.0 degrees or less. In an embodiment, the Trouser Tear Angle Simple Average of the laminated packaging film 150 can be 1.0, 0.9, 0.8, 0.7, 0.6, 0.5, 0.4, 0.3, 0.2, 0.1, or 0 degrees, or any value therebetween.

The force to tear the laminated packaging film 150 was also measured according to Standard Test Method for Propagation Tear Resistance of Plastic Film and Thin Sheeting by Pendulum Method, ASTM D1922-09, sometimes referred to as Elmendorf Tear, with the modifications described in the Test Methods section of the present application. The Elmendorf Tear values of the laminated packaging film 150 may give an indication of ease of tear to open a package that is formed from the laminated packaging film 150. The Elmendorf Tear values of the laminated packaging film 150 may be 200 grams (g) or less. In an embodiment, the Elmendorf Tear value of the laminated packaging film 150 can be 200, 195, 190, 185, 180, 175, 170, 165, 160, 155, 150, 145, 140, 135, 130, 125, 120, 115, 110, 100, 95, 90, 85, 80, 75, 70, 65, 60, 55, 50, 0 g, or any value therebetween.

In an embodiment, the laminated packaging film 150 includes a first film 152 that is a coextruded multilayer film. One of the layers of the first film 152 includes a composition that is a blend of EVOH and polyethylene, where the EVOH is present in an amount from 60 percent to 95 percent and the polyethylene is present in an amount from 5 percent to 40 percent by weight of the layer that the EVOH-polyethylene blend is present in. The EVOH includes an ethylene content from 24 mole percent to 50 mole percent. The first film 152 is laminated to a second film 154 that is an oriented film. The first film 152 and the second film 154 are laminated to each other via a laminating agent 155 that includes low density polyethylene (LLDPE). The laminated packaging film 150 includes an Elmendorf Tear of 200 g or less, according to ASTM D1922-09 as described herein, and a Trouser Tear Angle Average of the Absolute Values of 5.0 degrees or less according to ASTM 1938 as described herein.

In another embodiment, the laminated packaging film 150 includes a first film 152 that is a coextruded multilayer film. One of the layers of the first film 152 includes a composition that is a blend of EVOH and polyethylene, where the EVOH is present in an amount of 90 percent and the polyethylene is present in an amount of 10 percent by weight of the layer that the EVOH-polyethylene blend is present in. The EVOH includes an ethylene content from 32 mole percent. The first film 152 is laminated to a second film 154 that is an oriented film. The first film 152 and the second film 154 are laminated to each other via a laminating agent 155 that includes low density polyethylene (LLDPE). The laminated packaging film 150 includes an Elmendorf Tear of 200 g or less, according to ASTM D1922-09 as described herein, and a Trouser Tear Angle Average of the Absolute Values of 5.0 degrees or less according to ASTM 1938 as described herein.

Laminated Packaging Film Package

The laminated packaging film 150 may be fabricated into any type of hermetically sealed package format including, but not limited to bags, pouches, sachets, flow wrap, tray and lid, chub, bulk bag, or the like as is generally known in the packaging arts as similar to the packaging film 10. The laminated packaging film 150 may be used to package any type of product including, but not limited to, dry foods, liquids, meats, cheese, fresh foods, frozen foods, beverages, pharmaceuticals, nutraceuticals, cosmetics, hard-to-hold products, cleaners, chemicals, wipes, medical products, electronic devices, pet foods/treats, bulk products, etc.

In some embodiments of packages, the laminated packaging film 150 is used as one of the side walls of the package, or in some cases, all of the side walls. A pouch or bag may be sealed in a fin seal or lap seal configuration. In one embodiment, the package may be in the form of a stand-up pouch using the laminated packaging film 150 as the side walls. Fitments or other closures may be sealed to any part of the laminated packaging film 150.

Similar to packages formed from the packaging film 10, packages formed from the laminated packaging film 150 may include other non-limiting features such as tear initiators and/or a gripping or holding assist feature.

Figure 9:
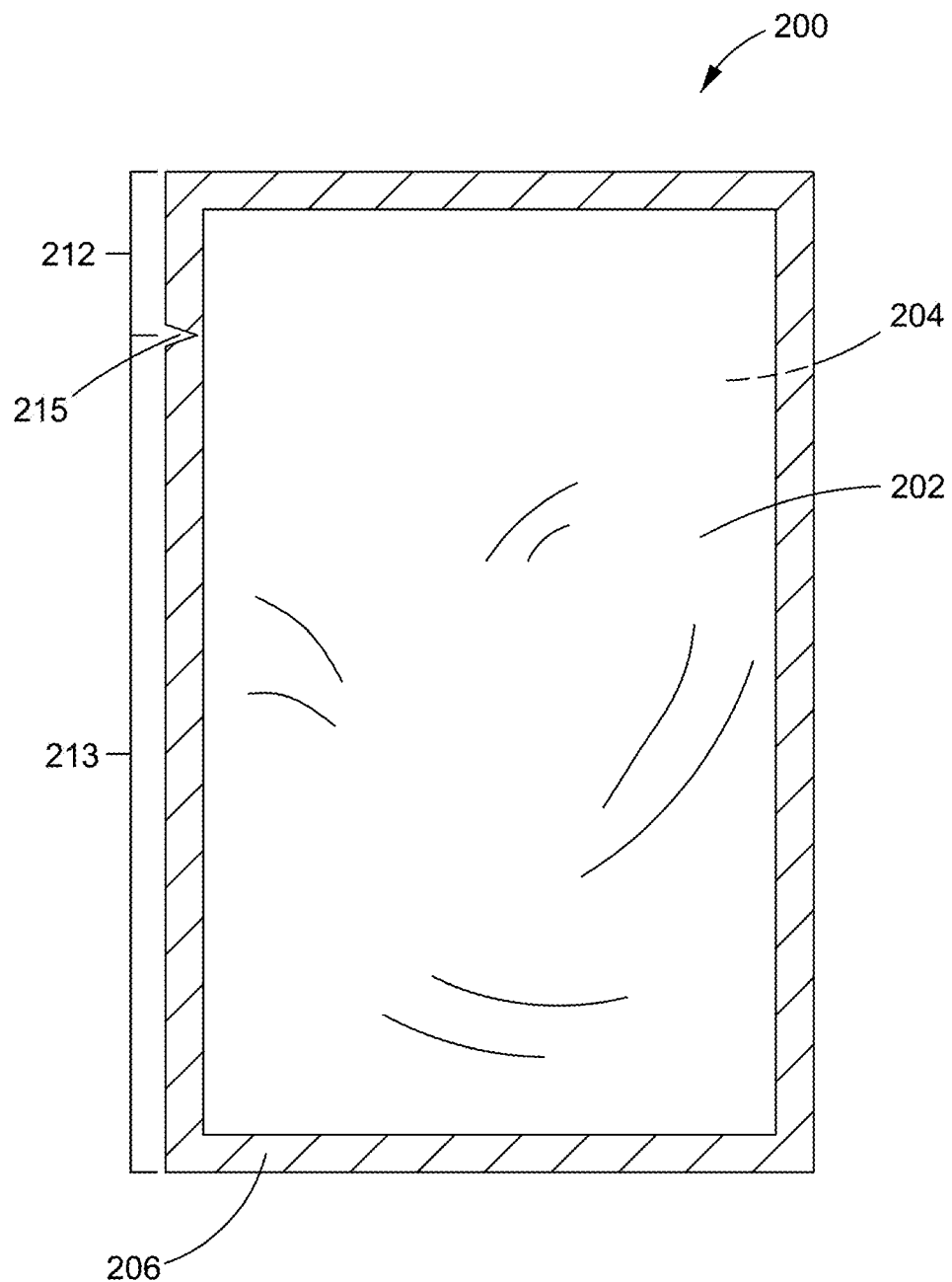
FIG. 9 illustrates a top view of a package in a closed state that is in the form of a pouch that is formed from the laminated packaging film disclosed herein.

A particular package format that may be formed from the laminated packaging film 150 is a pouch. The pouch may include sidewalls, or sidewalls and a gusset formed from the laminated packaging film 150. The pouches are typically pre-manufactured such that the intended opening of the package is in the machine direction of the laminated packaging film, the food is placed inside of the pouch and the pouch is sealed closed. A portion of the pouch is typically removed (torn in the machine direction of the laminated packaging film) to open the pouch and access the contents. With reference to FIG. 9, a package in the form of a pouch 200 is shown. The pouch 200 includes a first sidewall 202 and a second sidewall 204. The first sidewall 202 and the second sidewall 204 are sealed to each other with seals 206 at or near the sidewall edges. The pouch 200 includes a removable portion 212 and a body portion 213. The removable portion 212 and the body portion 213 are delineated from each other by a tear notch 215. Food or product (not shown) may be contained within the pouch 200 and more specifically within the body portion 213. FIG. 9 shows the pouch 200 in a sealed position before the pouch 200 is opened for use. To open the pouch 200, the removable portion 212 is grasped by one hand while the body portion 213 is grasped or held by the other hand and the removable portion 212 is pulled, typically towards the user's body, to separate the removable portion 212 from the body portion 213.

Figure 10:
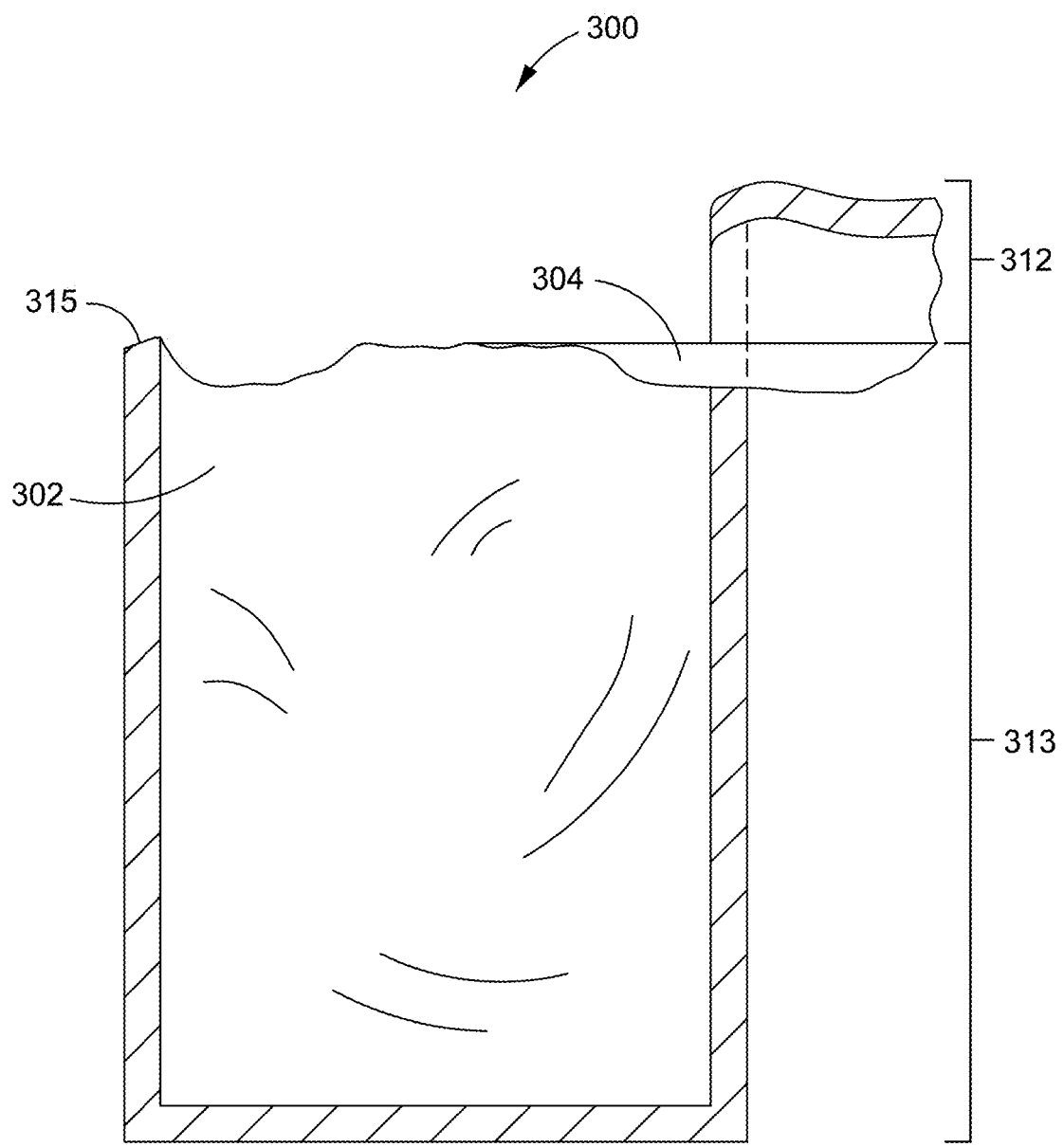
FIG. 10 illustrates a top view of a prior art package in an opened state that is in the form of a pouch.

Current and prior art pouches that include removable portions to open the pouch suffer from inconsistent performance when the tear of one sidewall and the tear of the other sidewall propagate away from each other. A prior art pouch 300 is shown in FIG. 10. A tear is started from tear notch 315 and as a result of the tear propagation of a first sidewall 302 being in opposition with a second sidewall 304, the end user must use a greater force to open the pouch 300 than if each of the sidewall tears propagated together in a linear fashion. FIG. 10 shows the tear propagation of the second sidewall 304 to be mostly linear and the tear propagation of the first sidewall 302 to be mostly non-linear. When the user is required to use greater force, this can cause spillage of the product contained within the pouch 300 and/or destruction of the pouch sidewalls 302, 304 such that the pouch 300 no longer properly contains the product. While the tear in FIG. 10 is shown as diverging into the body portion 313, the tear may also diverge into the removable portion 312.

Figure 11:
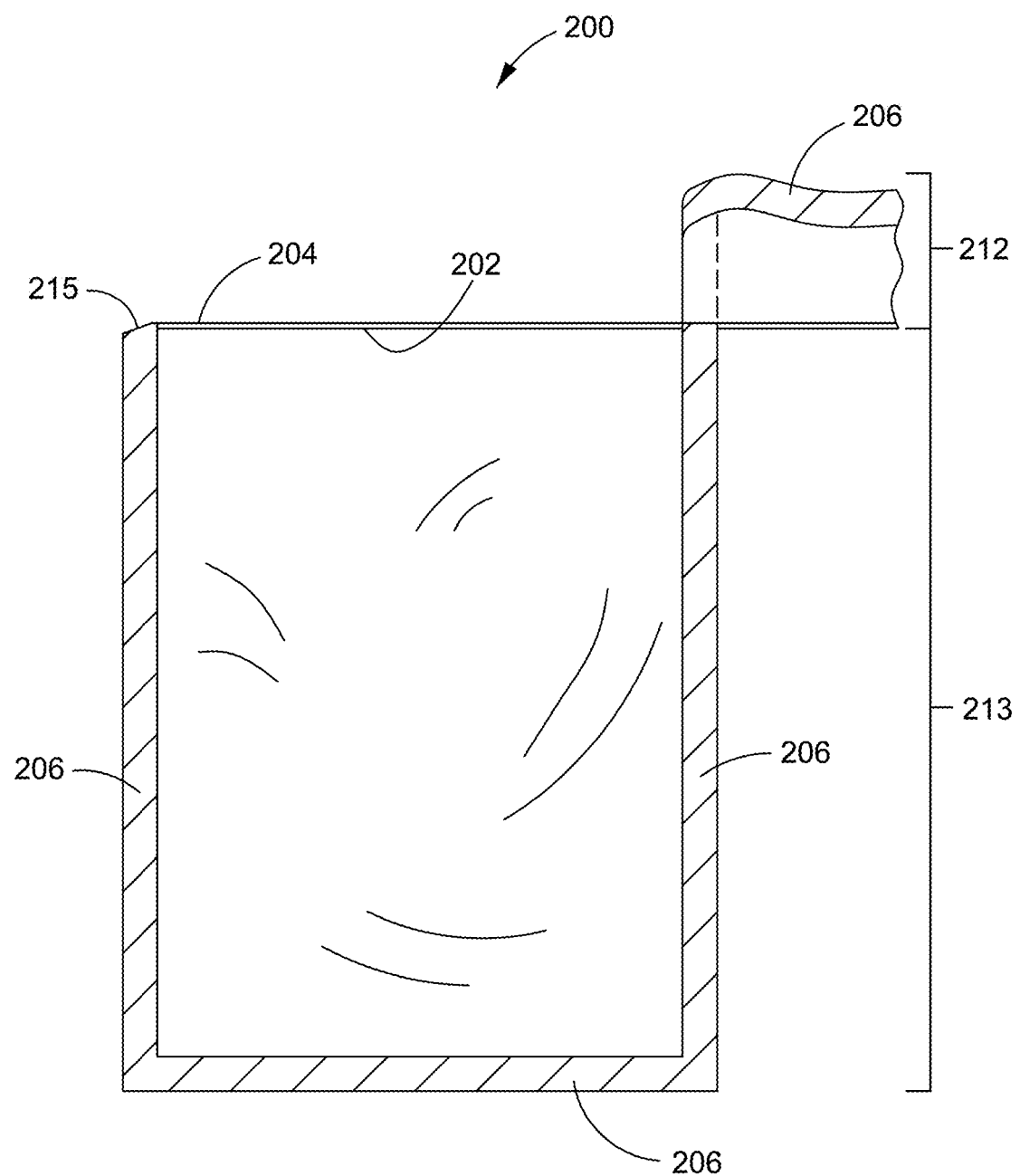
FIG. 11 illustrates a top view of the package shown in FIG. 9 in an opened state.

The pouch 200 that is shown in FIG. 9 is depicted in FIG. 11 in an opened state. The removable portion 212 has been pulled or torn away from the pouch body 213. The tear of the first sidewall 202 and the tear of the second sidewall 204 have propagated in a linear fashion such that the user exerts less force to open the pouch 200 than the prior art pouch 300.

The force to open the pouch 200 and the prior art pouch 300 was characterized quantitatively. The pouch 200 and the prior art pouch 300 were tested using ASTM D1922-09 with the noted modifications by making a 1-inch cut on one side of the pouch at the point of the tear notch 215, 315 perpendicular to the side edge of the pouches 200, 300. The 1-inch cut was made to eliminate the higher initial force required to start the tear and to provide a portion of the pouch 200, 300 for placement into the clamps of a tear strength measuring device such as one manufactured by Instron. The Instron crosshead speed was set at 900 mm/minute to better simulate tearing during actual use of the pouch 200, 300. Specimens were always torn in the same direction and due to the potential directionality of the tear, specimens were loaded into the Instron clamps with the sealing surface 16 of the laminated packaging film 150 facing downward and alternating the right and left specimen tabs in the upper and lower clamps to characterize the effect of "left-handedness" and "right-handedness". The alternation of the specimen tabs in the upper and lower clamps provided simulation of right-handed tear and left-handed tear, respectively.

The terms, "right-handed tear" or "right-handedness", as used herein, refer to a film specimen being held vertically (approximately 90 degrees) from a horizontal surface (approximately 0 degrees) by human hands (left hand holding the top left portion of specimen and right hand holding the top right portion of specimen) such that the right portion of the specimen is torn away from the left portion of the specimen by bringing the right hand towards the human body. The term, "left-handed tear" or "left-handedness", as used herein, refer to a film specimen being held vertically (approximately 90 degrees) from a horizontal surface (approximately 0 degrees) by human hands (left hand holding the top left portion of specimen (left trouser leg) and right hand holding the top right portion of specimen (right trouser leg)) such that the left portion of the specimen is torn away from the right portion of the specimen by bringing the left hand towards the human body and below the right hand.

The pouches 200 were found to have an average of the right-hand and the left-handed average pouch opening force of 1,500 g or less. For example, the "right-handedness" average pouch opening force and the "left-handedness" average pouch opening force were averaged together and found to be less than 1,500 g.

The opening force of the pouch 200 and the prior art pouch 300 were also qualitatively evaluated in a blind study. Respondents found 97 percent of the pouches 200 to open easily that was indicative of the tears in each of the sidewalls of the pouch 200 exhibiting machine directional linear tear. Respondents found 62 percent of prior art pouches 300 to open easily. This indicates that 38 percent of the prior art pouches opened with difficulty that was indicative of the tears in each of the sidewalls, whether in the body portion 313 or the removable portion 312, propagating non-linearly and/or asymmetrically from each other.

Test Methods

The Standard Test Method for Propagation Tear Resistance of Plastic Film and Thin Sheeting by Pendulum Method, ASTM D1922-09, with the following modifications:

Test specimen dimensions: 1.5 inches wide (TD of film) and 4 inches long (MD of film). Test specimens were selected to be without ink or printed areas for the packaging film and the laminated packaging film.

Half of the specimens were tested with the second layer (the sealant layer) facing the pendulum and the other half of the specimens were tested with the sealant layer facing away from the pendulum.

One ply of film was measured for each specimen with a 400 g weight.

Force measurements were recorded. Tear angle measurements from this test method only represented right-handed tear. Tear angle measurements were manually measured; see tear angle test method that follows.

The Standard Test Method for Tear-Propagation Resistance (Trouser Tear) of Plastic Film and Thin Sheeting by a Single-Tear Method, ASTM 1938-08 with the following modifications:

Test specimen dimensions: 1.5 inches wide (TD of film) and 4 inches long (MD of film). Test specimens were selected to be without ink or printed areas for the packaging film and the laminated packaging film.

Cut depth into the length of test specimens: 1 inch long cut approximately in the middle of a short edge of the specimen.

Tear strength measuring device details: e.g., Instron model 5967, (available from Instron, Norwood, MA, USA), 500 mm/minute crosshead speed, flat clamps and the clamps were started approximately 1 inch from each other at the beginning of each test.

Tear force measurements were not used to compare the films because the low crosshead speed doesn't represent actual use. Specimens were used to measure and record the Trouser Tear Angle Average Absolute Value and calculate the Tear Angle Simple Average.

Tear Angle

The specimens that were tested with the modified Trouser Tear test were used to measure tear angle. The sealant layer of the film was placed facing downward. A protractor was used to measure the tear angle by placing the protractor on top of one piece of the torn test specimen with the 0 (zero) of the protractor on the film edge created by the initial cut into the test specimen. Angles to the right (clockwise) of 0 were recorded as positive values and angles to the left (counterclockwise) of 0 were recorded as negative values.

Further, the angles were measured over the length of the tear that was through or within the remaining 3 inches of the Trouser Tear test specimen. For example, a more straight or linear tear may have propagated through the remaining 3 inches of the specimen (noted as center top in TABLE 1) and a non-linear tear may have propagated into a portion of the remaining 3 inches of the specimen and tore to the left of the right of the initial cut s (noted as left or right in TABLE 1).

Unless defined otherwise, all technical and scientific terms used herein have the same meanings as commonly understood by one of ordinary skill in the art to which this disclosure belongs. All publications and patents specifically mentioned herein are incorporated by reference for all purposes.

The following examples are offered for illustrative purposes only and are not intended to limit the scope of the present invention in any way. Indeed, various modifications of the invention, in addition to those shown and described herein, will become apparent to those skilled in the art from the foregoing description and the following examples and fall within the scope of the appended claims.

Packaging Film Examples

Comparative Example 1 film included: 75:25 LDPE-LLDPE blend/tie/38 mole percent EVOH/tie/mLLDPE-LDPE blend, where the EVOH layer is 17 percent by weight of the film Example 1 film included: 75:25 LDPE-LLDPE blend/tie/90:10 32 mole percent EVOH-LLDPE blend/tie/mLLDPE-LDPE blend where the EVOH layer is 19 percent by weight of the film The Trouser Tear data for Comparative Example 1 and Example 1 are shown in TABLE 1. Note the positive or negative value of Tear Angle indicates right- or left-handedness, respectively. The Average of Tear Angle Absolute Values and the Tear Angle Simple Average for these Examples are shown in TABLE 2.

TABLE 1

Packaging Film Trouser Tear Data

| Code | Right Side Clamp | Tear Handed-ness | Tear Direction | Average Tear (g) | Tear Angle (degrees) |
|---|---|---|---|---|---|
| Ex. 1 | Upper | Right | Center top | 89 | −1 |
| Ex. 1 | Upper | Right | Center top | 157 | 0 |
| Ex. 1 | Upper | Right | Center top | 82 | 0 |
| Ex. 1 | Upper | Right | Center top | 89 | 0 |
| Ex. 1 | Upper | Right | Center top | 121 | −1 |
| Ex. 1 | Upper | Right | Center top | 70 | −1 |

TABLE 1-continued

Packaging Film Trouser Tear Data

| Code | Right Side Clamp | Tear Handed-ness | Tear Direction | Average Tear (g) | Tear Angle (degrees) |
|---|---|---|---|---|---|
| Ex. 1 | Lower | Left | Center top | 108 | 1 |
| Ex. 1 | Lower | Left | Center top | 143 | 0 |
| Ex. 1 | Lower | Left | Center top | 117 | 1 |
| Ex. 1 | Lower | Left | Center top | 101 | 1 |
| Ex. 1 | Lower | Left | Center top | 125 | 0 |
| Ex. 1 | Lower | Left | Center top | 90 | 1 |
| Comp. Ex. 1 | Upper | Right | Right | 154 | 20 |
| Comp. Ex. 1 | Upper | Right | Right | 173 | 20 |
| Comp. Ex. 1 | Upper | Right | Right | 182 | 20 |
| Comp. Ex. 1 | Upper | Right | Right | 145 | 20 |
| Comp. Ex. 1 | Upper | Right | Left | 158 | −20 |
| Comp. Ex. 1 | Upper | Right | Left | 170 | −20 |
| Comp. Ex. 1 | Lower | Left | Right | 142 | 20 |
| Comp. Ex. 1 | Lower | Left | Right | 167 | 20 |
| Comp. Ex. 1 | Lower | Left | Right | 166 | 20 |
| Comp. Ex. 1 | Lower | Left | Right | 152 | 20 |
| Comp. Ex. 1 | Lower | Left | Left | 181 | −20 |
| Comp. Ex. 1 | Lower | Left | Left | 159 | −20 |

TABLE 2

Packaging Film Trouser Tear Angle: Average of Absolute and Simple Average Values

| Code | Average of Tear Angle Absolute Values | Tear Angle Simple Average | Standard Deviation of Tear Angle |
|---|---|---|---|
| Ex. 1 | 0.58 | 0.08 | 0.76 |
| Comp. Ex. 1 | 20 | 6.67 | 18.9 |

Laminated Packaging Film Examples

The following components were used to make laminated packaging films:
OPET
 BOPET-1: 48 ga biaxially oriented PET
 BOPET-2: 48 ga biaxially oriented PET
Extrudate/Laminating Agent (LA)
 LLDPE-LDPE: 50:50 LLDPE and LDPE blend
 LDPE: 100 percent LDPE
Sealant Layer
 Control: Comparative Example 1 of Packaging Film Example
 EVOH+PE: Example 1 of Packaging Film Example The laminated packaging film structures and related tear data are shown in TABLE 5.

TABLE 5

Laminated Packaging Film Elmendof and Trouser Tear Average of Absolute and Simple Average Values

| | Structure Components | | | Elmendorf Tear (g) | Angle Absolute Value | Angle Simple Average | Standard Deviation of Tear Angle |
|---|---|---|---|---|---|---|---|
| Code | OPET | LA | Sealant | | | | |
| Ex. 1 | BOPET-2 | LLDPE-LDPE | EVOH + PE | 88 | 2.3 | 0.3 | 2.9 |
| Ex. 2 | BOPET-2 | LDPE | EVOH + PE | 83 | 4 | 0.3 | 4.1 |
| Ex. 3 | BOPET-1 | LLDPE-LDPE | EVOH + PE | 86 | 4.5 | −4.2 | 4.5 |

TABLE 5-continued

Laminated Packaging Film Elmendof and Trouser Tear
Average of Absolute and Simple Average Values

| | Structure Components | | | Elmendorf Tear | Angle Absolute | Angle Simple | Standard Deviation of |
|---|---|---|---|---|---|---|---|
| Code | OPET | LA | Sealant | (g) | Value | Average | Tear Angle |
| Comp. Ex. 1 | BOPET-1 | LLDPE-LDPE | Control | 72 | 6.5 | 2.4 | 6.7 |

Pouch Examples

Pouches were formed from the laminated packaging films on production equipment and the average pouch opening force (g) for each pouch is shown in TABLE 6. The average of the right-handed and left-handed average pouch opening force is shown in the far-right column of TABLE 6.

TABLE 6

Laminated Packaging Film Pouch Opening Force

| | Structure Components | | | Average Pouch Opening Force (g) | | Average of Right- and Left-Handed |
|---|---|---|---|---|---|---|
| Code | OPET | LA | Sealant | Right-Handed | Left-Handed | Opening Force (g) |
| Ex. 1 | BOPET-2 | LLDPE-LDPE | EVOH + PE | 760 | 1,298 | 1,029 |
| Ex. 2 | BOPET-2 | LDPE | EVOH + PE | 690 | 859 | 774 |
| Ex. 3 | BOPET-1 | LLDPE-LDPE | EVOH + PE | 1,013 | 1,974 | 1,494 |
| Comp. Ex. 1 | BOPET-1 | LLDPE-LDPE | Control | 2,157 | 1,439 | 1,798 |

Qualitative pouch data is shown in TABLE 7.

TABLE 7

Laminated Packaging Film Pouch Opening Evaluation

| Code | Percent of "Good" Pouches (%) | Number of "Good" Pouches | Total Number of Pouches Tested |
|---|---|---|---|
| Example 1 BOPET - LLDPE-LDPE - EVOH | 70 | 208 | 299 |
| Example 2 BOPET - LDPE - EVOH + PE | 97 | 290 | 300 |
| Comparative Example 1 (current commercial film; OPET - LDPE - EVOH) | 62 | 63 | 101 |

Embodiments

A) A directional tear packaging film comprising a coextruded film comprising:
a machine direction linear tear layer that comprises from 60 percent to 95 percent ethylene vinyl alcohol copolymer (EVOH) and from 5 percent to 40 percent polyethylene; and
a second layer;
wherein the EVOH comprises an ethylene content from 24 mole percent to 50 mole percent.

B) The packaging film according to any of the embodiments A through H, wherein the second layer comprises a sealant layer comprising a sealing surface.

C) The packaging film according to any of the embodiments A through H, wherein the EVOH comprises an ethylene content of 44 mole percent to 50 mole percent.

D) The packaging film according to any of the embodiments A through H, further comprising a Trouser Tear Angle Average of the Absolute Values that is 2.0 degrees or less according to ASTM 1938 as described herein.

E) The packaging film according to any of the embodiments A through H, wherein the polyethylene comprises ultra-low density polyethylene, low density polyethylene, linear low density polyethylene, medium density polyethylene, ethylene vinyl acetate copolymer (EVA), or blends thereof.

F) The packaging film according to any of the embodiments A through H, wherein the film is a shrink film comprising a minimum of 5 percent free shrink in each direction, the machine direction or the transverse direction.

G) The packaging film according to any of the embodiments A through H, further comprising an oriented film.

H) The packaging film according to any of the embodiments A through G, wherein the oriented film further comprises a biaxially oriented film.

I) A package comprising the packaging film according to any of the embodiments A through H.

J) A directional tear packaging film comprising:
a first film comprising a machine direction linear tear layer that comprises from 60 percent to 95 percent ethylene vinyl alcohol copolymer (EVOH) and from 5 percent to 40 percent polyethylene and a second layer comprising a sealing layer comprising a sealing surface;

a laminating agent; and a second film comprising an oriented film;

wherein the first film is a coextruded film, wherein the laminating agent is positioned between the first film and the second film such that the sealing surface is exposed, and wherein the EVOH of the machine direction linear tear layer comprises an ethylene content from 24 mole percent to 50 mole percent.

K) The packaging film according to any of the embodiments J through N, further comprising a Trouser Tear Angle Average of the Absolute Values that is 5 degrees or less according to ASTM 1938 as described herein.

L) The packaging film according to any of the embodiments J through N, wherein the second film comprises an oriented polyester film.

M) The packaging film according to any of the embodiments J through N, wherein the second film comprises a biaxially oriented polyester film.

N) The packaging film according to any of the embodiments J through N, wherein the laminating agent comprises low density polyethylene.

O) A package comprising the packaging film according to any of the embodiments J through N.

P) The package according to any of the embodiments O through R, wherein the package is a pouch comprising a removable portion, a product space portion and a tear initiator.

Q) The package according to any of the embodiments O through R, wherein the tear initiator comprises a tear notch.

R) The package according to any of the embodiments O through R, wherein the tear initiator comprises a score line.

What is claimed is:

1. A directional tear packaging film comprising:
   a first film that is an unoriented film comprising a machine direction linear tear layer that comprises from 60 percent to 95 percent ethylene vinyl alcohol copolymer (EVOH) and from 5 percent to 40 percent polyethylene and a second layer comprising a sealing layer comprising a sealing surface;
   a laminating agent; and
   a second film comprising an oriented film;
   wherein the first film is a coextruded film, wherein the laminating agent is positioned between the first film and the second film such that the sealing surface is exposed, and wherein the EVOH of the machine direction linear tear layer comprises an ethylene content from 24 mole percent to 50 mole percent.

2. The packaging film of claim 1, further comprising a Trouser Tear Angle Average of the Absolute Values that is 5 degrees or less according to ASTM 1938 as described herein.

3. The packaging film of claim 1, wherein the laminating agent comprises low density polyethylene.

4. The packaging film of claim 1, wherein the second film comprises an oriented polyester film.

5. The packaging film of claim 4, wherein the second film comprises a biaxially oriented polyester film.

\* \* \* \* \*